Figure 1:
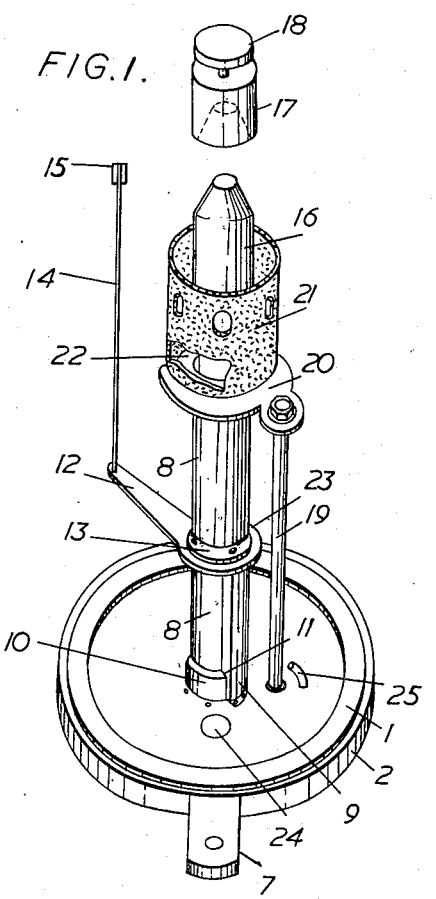

June 20, 1961  H. F. STERLING  2,989,378
PRODUCING SILICON OF HIGH PURITY
Filed Oct. 7, 1957  2 Sheets-Sheet 1

*Inventor*
H. F. Sterling
By John M. Cahrufle
*Attorney*

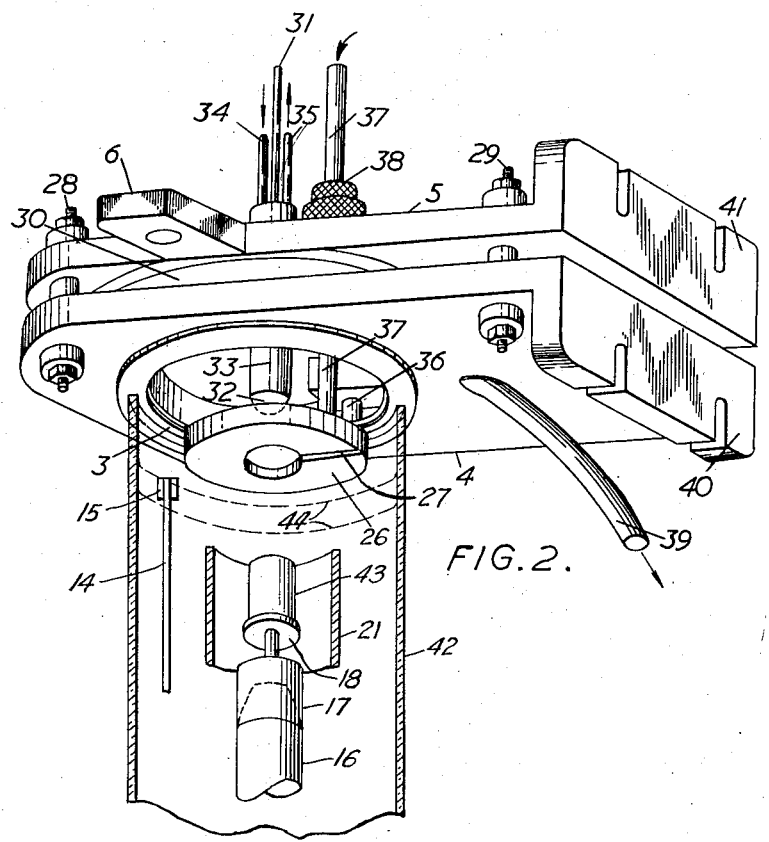

United States Patent Office 2,989,378
Patented June 20, 1961

2,989,378
PRODUCING SILICON OF HIGH PURITY
Henley Frank Sterling, London, England, assignor to International Standard Electric Corporation, New York, N.Y., a corporation of Delaware
Filed Oct. 7, 1957, Ser. No. 688,593
Claims priority, application Great Britain Oct. 16, 1956
5 Claims. (Cl. 23—252)

The present invention relates to processes and apparatus for the manufacture of silicon of high purity.

The invention comprises an improvement in, or modification of, the invention described and claimed in British Patent No. 745,698, granted June 20, 1956, which for convenience will be called the parent specification.

The parent specification describes a process and apparatus for the production of a silicon ingot by thermal decomposition of pure silane on a heated silicon seed. The apparatus described in the parent specification was not entirely satisfactory, largely on account of the rather indirect manner in which the silicon seed was heated. Certain other difficulties were also encountered. First, since the seed is heated by coupling to a high frequency electromagnetic field, when the silicon seed is very pure, the cold resistance is so high that it is difficult to start the heating because the eddy currents are so small. Secondly, because there is generally a slight amount of gas-phase decomposition of the silane, silicon tends to be deposited on the inside surface of the glass or quartz envelope of the decomposition chamber and obscures the view of the growing silicon ingot. Thirdly, the silane jet and the concentrator become hot and tend to contaminate the silicon by evaporation of unwanted impurities from their surfaces.

The object of the present invention is to improve the silane decomposition process and apparatus so that the above-mentioned objections and difficulties are removed.

The object is achieved according to the invention by providing a process for the manufacture of substantially pure silicon which comprises passing substantially pure silane in a molecular concentration substantially less than normal into a zone containing a surface heated to a temperature at least equal to the decomposition temperature of silane, in which the said surface is heated by direct coupling to the electromagnetic field of a concentrator coil supplied with a high-frequency alternating electric current.

The invention also provides a process for the manufacture of substantially pure silicon which comprises passing substantially pure silane in a molecular concentration substantially less than normal into a zone containing a surface heated to a temperature at least equal to the decomposition temperature of silane, whereby silicon is deposited on the said surface, and cooling other bodies in the neighborhood of the said surface whereby only the said surface becomes appreciably heated.

The invention further provides a coherent body of silicon when made according to one of these processes.

The invention also provides apparatus for carrying out these processes.

In the above statements, the expression "in a molecular concentration substantially less than normal" means that the number of molecules of the silane in a cubic centimetre is substantially less than the number of molecules normally contained in one cubic centimetre of the pure gas at the decomposition temperature, and at atmospheric pressure.

The invention will be described with reference to the drawings, in which:

FIG. 1 shows an isometric diagram of the lower part of the decomposition apparatus; and FIG. 2 shows a perspective view of the upper part of the apparatus.

The chamber in which the silane is decomposed is enclosed by an envelope in the form of a cylindrical glass or quartz tube which connects the lower part of the apparatus which is shown in FIG. 1, to the upper part shown in FIG. 2. For clearness, only part of the envelope is shown at 42 in FIG. 2. An axial section of the envelope is supposed to have been taken, and the front portion removed.

The lower edge of the envelope 42 (not shown in FIG. 1) rests on a sealing ring 1 of suitable material mounted on the metal baseplate 2 of the lower part of the apparatus shown in FIG. 1. The upper end of the enclosing tube 42 is closed by the sealing ring 3 of the assembly shown in FIG. 2, which ring is mounted on a thick metal plate 4. Some of the elements of FIG. 1 are shown also in FIG. 2. The plate 4 of FIG. 2 is secured to a second thick metal plate 5 bearing two or more clamping lugs of which one, designated 6, is shown, the others being not visible. A similar set of lugs is provided on the baseplate 2 of FIG. 1, and one of them is designated 7. The whole assembly is clamped together by rods (not shown) which pass through corresponding clamping lugs of the plates 2 and 5.

Referring to FIG. 1, a shaft 8 passes through a bush 9 mounted centrally on the plate 2. Only part of the bush 9 is shown. The space between the shaft 8 and the bush 9 is sealed by a ring 10 of suitable plastic material, such, for example, as polytetrafluorethylene. The bush 9 has a shoulder 11 which keeps the ring 10 in place. A radial arm 12 is connected to the shaft 8 by a friction clutch (not shown), and by means of a plate 13 is secured to the bush 9 in such manner that the arm 12 can rotate but cannot move vertically. The details of this arrangement are not shown. The arm 13 carries a vertical rod 14 on which is mounted a wiper 15 which bears against the inside surface of the enclosing tube, as can be seen from FIG. 2.

By means of a mechanism also not shown, the shaft 8 may be rotated as well as moved vertically, and when it rotates, it carries the arm 12 and wiper 15 with it, on account of the friction clutch, which, however, permits the vertical movement of the shaft 8. During the decomposition of the silane, the shaft 8 is continuously rotated, carrying the wiper 15 with it, and is also slowly drawn downwards as the silicon ingot grows.

The upper end of shaft 8 is tapered at 16. A boss 17 has a similar internal taper and carries at its upper end a plate 18, on which a silicon seed may be placed. Such a seed is shown in FIG. 2 at 43. The boss 17 is adapted to be mounted on the top of the shaft 16.

A rod 19 passes through the baseplate 1 through a vacuum-tight joint and has fixed at its upper end a horseshoe-shaped plate 20 which surrounds the shaft 8, and supports a perforated carbon cylinder 21, the lower end of which is partly closed by an annular plate 22 which also surrounds the shaft 8. Part of the cylinder 21 is shown broken away to enable the annular plate 22 to be seen. The carbon cylinder may be moved upwards by the shaft 19 until it surrounds the plate 18. This is for the purpose of preheating the silicon seed, as will be explained in more detail later. When preheating is completed the rod 19 is drawn right down, and the horseshoe plate 20 clears and passes below the arm 12, and the annular plate 22 of the carbon cylinder 21 then rests on the flange 23 of the arm 12. The rod 19 is now out of the way and the arm 12 can then rotate.

The base plate 2 is provided with a hole 24 for the pipe (not shown) leading to the pump (also not shown) for exhausting the envelope. A small pipe 25 also passes through the baseplate 2 and leads to a manometer (not shown) for indicating the pressure.

FIG. 2 shows the arrangements by which the silicon is heated. These arrangements include a single-turn heating coil 26 in the form of a closed annular copper box which, however, is divided by a slot 27. This heating coil is supported below a circular aperture in the plate 4 in a manner which will be explained later. The two plates 4 and 5 are clamped together, but insulated from one another, by bolts and insulating washers as shown at 28 and 29. A vacuum seal is provided between the two plates 4 and 5 by means of a ring of plastic material 30.

Silane is supplied through an inlet pipe 31 to a jet nozzle 32 at the end of a pipe 33, which forms a jacket round the pipe 31. The jet is placed close to the aperture in the heating coil 26. The pipe 33 is vacuum sealed through the upper plate 5, and is provided with water inlet and outlet pipes 34 and 35 for cooling the jet.

The coil 26 is secured to the plate 4 by a metal pipe 36, and to the plate 5 by a metal pipe 37 which passes through the plate 5 by a vacuum seal at 38. The pipe 36 is connected through a channel in the plate 4 to a pipe 39 which is outside the enclosing envelope 42. Water for cooling the coil 26 passes in through the pipe 37 and out through the pipe 39. The plates 4 and 5 have respective heavy flanges 40 and 41 which are intended to be bolted to the terminals of the secondary winding of a power transformer (not shown) which supplies a high-frequency alternating current to the coil 26 on opposite sides of the slot 27, through the pipes 36 and 37 which also form the electrical connections.

The elements 14, 15, 16, 17, 18 and 21 of FIG. 1 are also shown in FIG. 2 and the plate 18 on which the growing silicon ingot (not shown) is mounted, is coaxial with and below the aperture in the coil 26. During the deposition of the silicon on the seed 43, or on the ingot as it grows, the surface of the seed or ingot is maintained rather close to the under surface of the coil 26 and becomes heated by coupling to the electromagnetic field of the coil. In FIG. 2, the surface of the seed 43 is shown rather below the position it normally occupies during decomposition of the silane. The silane issuing from the jet 32 is decomposed on the heated surface of the seed or ingot, and the shaft 8 is continuously lowered to maintain the surface of the ingot at a substantially constant distance from the under surface of the coil 26. The wiper 15, however is not lowered with the shaft 8, but wipes a band shown by the dotted line 44 on the inside of the enclosing envelope 42 at such a constant height that the heated surface of the ingot can be seen through the wiped band in order to enable the process to be controlled.

When it is necessary to use the carbon cylinder 21 (FIG. 1) to start the heating process, it will be brought up to the position shown in section in FIG. 2, so that it surrounds the seed 43 mounted on the plate 18. The carbon cylinder itself becomes heated by coupling to the coil 26 and heats the silicon seed 43 by radiation until the resistance of the seed is reduced sufficiently for it to be heated directly from the coil 26. The carbon cylinder 21 is then lowered out of the way as described with reference to FIG. 1, and the shaft 8 is raised to bring the surface of the seed 43 close to the underside of the coil 26.

It should be explained that it is not essential to start with a silicon seed. Decomposition may be arranged to take place directly on the plate 18, and if this plate be of a material of suitable resistivity such as molybdenum, it can be raised to the decomposition temperature by coupling to the coil 26. In that case the carbon cylinder 21 is not required and may be omitted, unless it is expected that it may sometimes be necessary to re-heat the silicon ingot after it has been allowed to cool.

The material of the plate 18 should have approximately the same coefficient of expansion as silicon otherwise the silicon deposited thereon will tend to split off on cooling.

It has already been mentioned that a small amount of gas phase decomposition of the silane may take place, and silicon tends to be deposited in the form of a fluff on the coil 26 and may short-circuit the slot 27. If necessary therefore, the slot 27 may be widened into an appreciable sector, which may for example have an angle as much as 90°, so that danger of short-circuit by the silicon fluff is avoided.

The arrangement which has been described with reference to FIGS. 1 and 2 produces very efficient heating of the silicon ingot, and it has the important feature that the ingot is the only body which becomes appreciably hot. The advantages of this are:

(1) The silane is decomposed on the silicon ingot, and not on the surrounding surfaces.

(2) No contamination is produced by evaporation from neighbouring hot bodies.

(3) The amount of gas-phase decomposition is reduced to a minimum so that the minimum amount of silicon dust or fluff is produced.

It has been found that with the apparatus described it is possible to achieve almost 100% decomposition of the silane gas into solid silicon and hydrogen by using a suitable combination of low rate of flow of the silane, low pressure in the decomposition chamber, and a large surface area for the ingot. Under such conditions the gorwth rate is very slow, for example about 0.1 gram per hour. However much greater rates of growth can be obtained at the expense of decomposing only about 50% of the silane. Two examples are given in the following table:

| | | |
|---|---|---|
| Pressure in chamber, mm. Hg | 12 | 10 to 15 |
| Flow rate of Silane, litres per hour | 18 | 30 |
| Temperature of Decomposition, 900° C | 900 | 1,100–1,200 |
| Growth Rate, grams per hour | 10.5 | 18 |
| Percent Decomposition of Silane | 47 | 50 |

When the percentage decomposition of the silane is so low as 50% it is desirable to recover the undecomposed silane. A steel trap cooled in liquid nitrogen may be included in the pumping system between the pump and the decomposition chamber. This has been found to remove practically all the silane from the hydrogen, and by suitable operation of the routing control valves the recovered silane can be evaporated and returned to the silane store during and after the decomposition process.

It should be mentioned that the concentrator coil 26 (FIG. 2) is not necessarily a single-turn coil. In some circumstances it may be desirable for it to have more than one turn.

While the principles of the invention have been described above in connection with specific embodiments, and particular modifications thereof, it is to be clearly understood that this description is made only by way of example and not as a limitation on the scope of the invention.

What I claim is:

1. Apparatus for production of a solid by the thermal decomposition of a gas or vapor containing a compound of the solid, comprising a transparent cylindrical envelope, means for directing a stream of gas or vapor into said envelope, a device within said envelope having a surface upon which deposit of said solid takes place, positioned in the path of the stream as directed from said directing means and an inductive heater coil within said envelope surrounding the area traversed by said stream in a zone in close proximity to and above said surface, leads for supplying a high-frequency alternating current to said coil, a shaft for supporting and rotating the surface of said device, and means for moving said shaft longitudinally in a direction parallel to the axis of said coil, a wiper bearing against said envelope and coupled to said shaft for rotation therewith to wipe a circular strip inside said envelope, and means for retaining said wiper in fixed longitudinal position during longitudinal movement of said shaft and said device.

2. Apparatus for production of a solid by the thermal decomposition of a gas or vapor containing a compound of the solid, comprising a transparent cylindrical envelope, means for directing a stream of gas or vapor into said envelope, a device within said envelope having a surface upon which deposit of said solid takes place, positioned in the path of the stream as directed from said directing means and an inductive heater coil within said envelope surrounding the area traversed by said stream in a zone in close proximity to and above said surface, leads for supplying a high-frequency alternating current to said coil, a shaft for supporting and rotating the surface of said device, and means for moving said shaft longitudinally in a direction parallel to the axis of said coil, a wiper bearing against said envelope and coupled to said shaft for rotation therewith to wipe a circular strip inside said envelope, and means for retaining said wiper in fixed longitudinal position during longitudinal movement of said shaft and said device, a cylindrical body of resistive material supported within said envelope coaxially of said coil, means for moving said body from a position relatively remote from said surface, into a position near to said surface, whereby said body will be heated by direct coupling with said coil to preheat said surface by radiation.

3. Apparatus according to claim 2 wherein said body comprises a carbon cylinder.

4. Apparatus for producing a coherent body of substantially pure semi-conductor for a gaseous compound of the semi-conductor which can be thermally decomposed, comprising a substantially cylindrical transparent envelope member, support means substantially closing the ends of said cylindrical member, a shaft coaxially of said member extending through one of said support means into said envelope and positioned for rotary and axial movement, a support plate mounted at the end of said shaft with said envelope for movement therewith, an inlet nozzle extending through the other of said support means and positioned to direct a stream of gas toward said support plate, an annular heater coil mounted on said second support means within said envelope near the extremity of longitudinal movement of said support plate, said heater coil being hollow, means for circulating cooling liquid through said heater coil, a jacket for said nozzle, means for circulating cooling liquid through said jacket, a wiper in contact with the inside of said transparent member and positioned longitudinally below said coil and adjacent thereto, and means for coupling said wiper to said shaft for rotation therewith.

5. Apparatus according to claim 4, further comprising a hollow cylinder of high resistivity material positioned coaxially within said cylindrical member, and means for moving said cylinder axially of said member into and away from direct coupling with said coil.

References Cited in the file of this patent

UNITED STATES PATENTS

| | | |
|---|---|---|
| 2,149,076 | Stockbarger | Feb. 28, 1939 |
| 2,631,356 | Sparks et al. | Mar. 17, 1953 |
| 2,768,074 | Stauffer | Oct. 23, 1956 |
| 2,773,745 | Olson | Dec. 11, 1956 |
| 2,776,874 | Reed et al. | Jan. 8, 1957 |
| 2,804,377 | Butler et al. | Aug. 27, 1957 |

FOREIGN PATENTS

| | | |
|---|---|---|
| 745,698 | Great Britain | Feb. 29, 1956 |